(12) United States Patent
Bickford et al.

(10) Patent No.: US 8,843,874 B2
(45) Date of Patent: Sep. 23, 2014

(54) POWER AND TIMING OPTIMIZATION FOR AN INTEGRATED CIRCUIT BY VOLTAGE MODIFICATION ACROSS VARIOUS RANGES OF TEMPERATURES

(71) Applicant: International Business Machines Corporation, Armonk, NY (US)

(72) Inventors: Jeanne P. Bickford, Essex Junction, VT (US); Eric A. Foreman, Fairfax, VT (US); Mark W. Kuemerle, Essex Junction, VT (US); Susan K. Lichtensteiger, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/929,893

(22) Filed: Jun. 28, 2013

(65) Prior Publication Data

US 2013/0326460 A1 Dec. 5, 2013

Related U.S. Application Data

(62) Division of application No. 13/484,451, filed on May 31, 2012, now Pat. No. 8,543,960.

(51) Int. Cl.
*G06F 17/50* (2006.01)
*G01R 31/30* (2006.01)
*G01R 31/317* (2006.01)

(52) U.S. Cl.
CPC ...... *G06F 17/5045* (2013.01); *G01R 31/31725* (2013.01); *G06F 17/5031* (2013.01); *G01R 31/3016* (2013.01); *G01R 31/3004* (2013.01)
USPC ............................ 716/134; 716/104; 716/113

(58) Field of Classification Search
CPC .................................. G06F 17/50; G06F 9/455
USPC ........................................ 716/105, 113, 134
See application file for complete search history.

(56) References Cited

U.S. PATENT DOCUMENTS

| 5,084,824 | A | 1/1992 | Lam et al. |
| 5,974,247 | A | 10/1999 | Yonezawa |
| 6,452,454 | B1 | 9/2002 | Shapiro et al. |
| 7,475,366 | B2 * | 1/2009 | Kuemerle et al. ............. 716/134 |
| 7,653,888 | B2 | 1/2010 | Habib et al. |

(Continued)

OTHER PUBLICATIONS

U.S. Appl. No. 13/749,851, Office Action Communication Dated Jan. 9, 2014, pp. 1-10.
U.S. Appl. No. 13/484,451, filed May 31, 2012, Office Action Communication, Apr. 15, 2013, 4 pages.
U.S. Appl. No. 13/484,451, filed May 31, 2012, Notice of Allowance Communication, May 15, 2013, 14 pages.

*Primary Examiner* — Thuan Do
(74) *Attorney, Agent, or Firm* — Gibb & Riley, LLC

(57) ABSTRACT

A method of optimizing power and timing for an integrated circuit (IC) chip, which uses an IC technology that exhibits temperature inversion, by modifying a voltage supplied to the IC chip, while meeting power consumption and timing delay performances across lower and higher temperature ranges. A high voltage is selected that meets a closed timing analysis across a full temperature range to meet a timing performance and a low voltage is selected to meet the timing performance and the power performance across a lower temperature range to a temperature cut point in the higher temperature range. The IC chip is turned on at the high voltage and the high voltage is lowered to the low voltage when the temperature cut point is exceeded to meet the power performance while maintaining the timing performance.

19 Claims, 6 Drawing Sheets

(56) References Cited

U.S. PATENT DOCUMENTS

| | | |
|---|---|---|
| 7,714,635 B2 | 5/2010 | Singh et al. |
| 7,941,779 B2 | 5/2011 | Rahmat et al. |
| 7,958,478 B2 | 6/2011 | Saito et al. |
| 8,413,095 B1 | 4/2013 | Dubuque et al. |
| 2009/0019408 A1 | 1/2009 | Saito et al. |
| 2009/0228843 A1 | 9/2009 | Anemikos et al. |
| 2010/0095259 A1 | 4/2010 | Tetelbaum |
| 2011/0163801 A1 | 7/2011 | Chua-Eoan |

\* cited by examiner

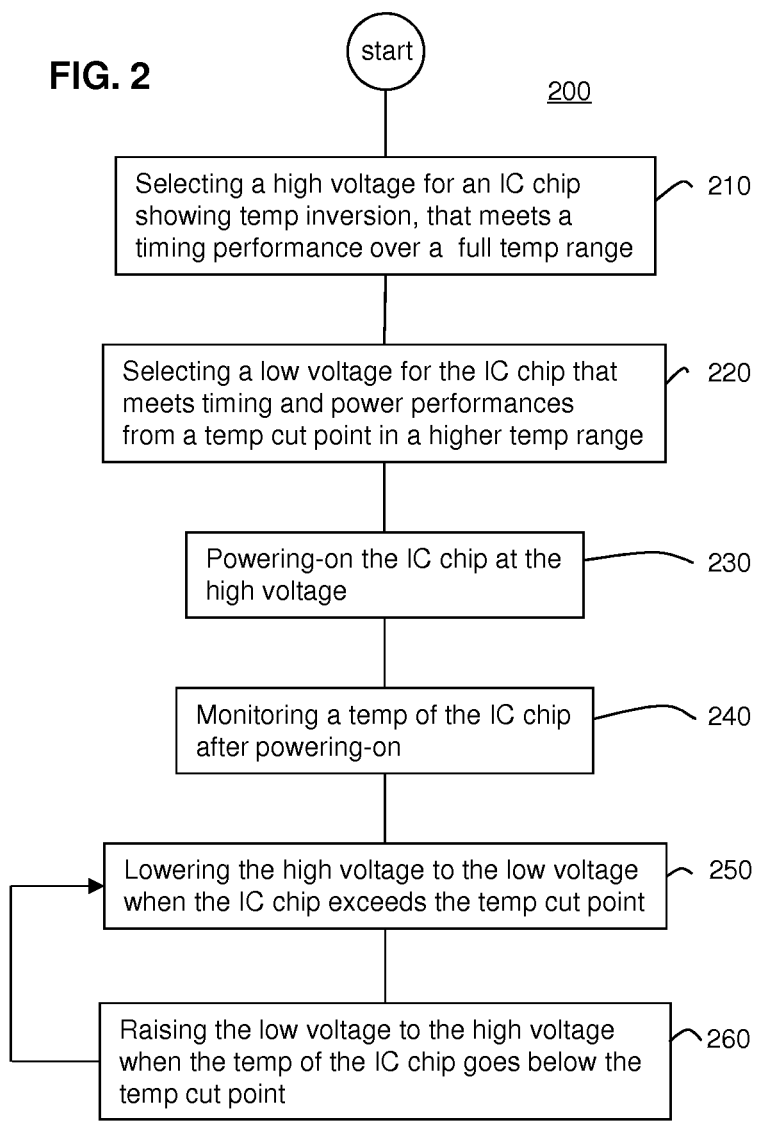

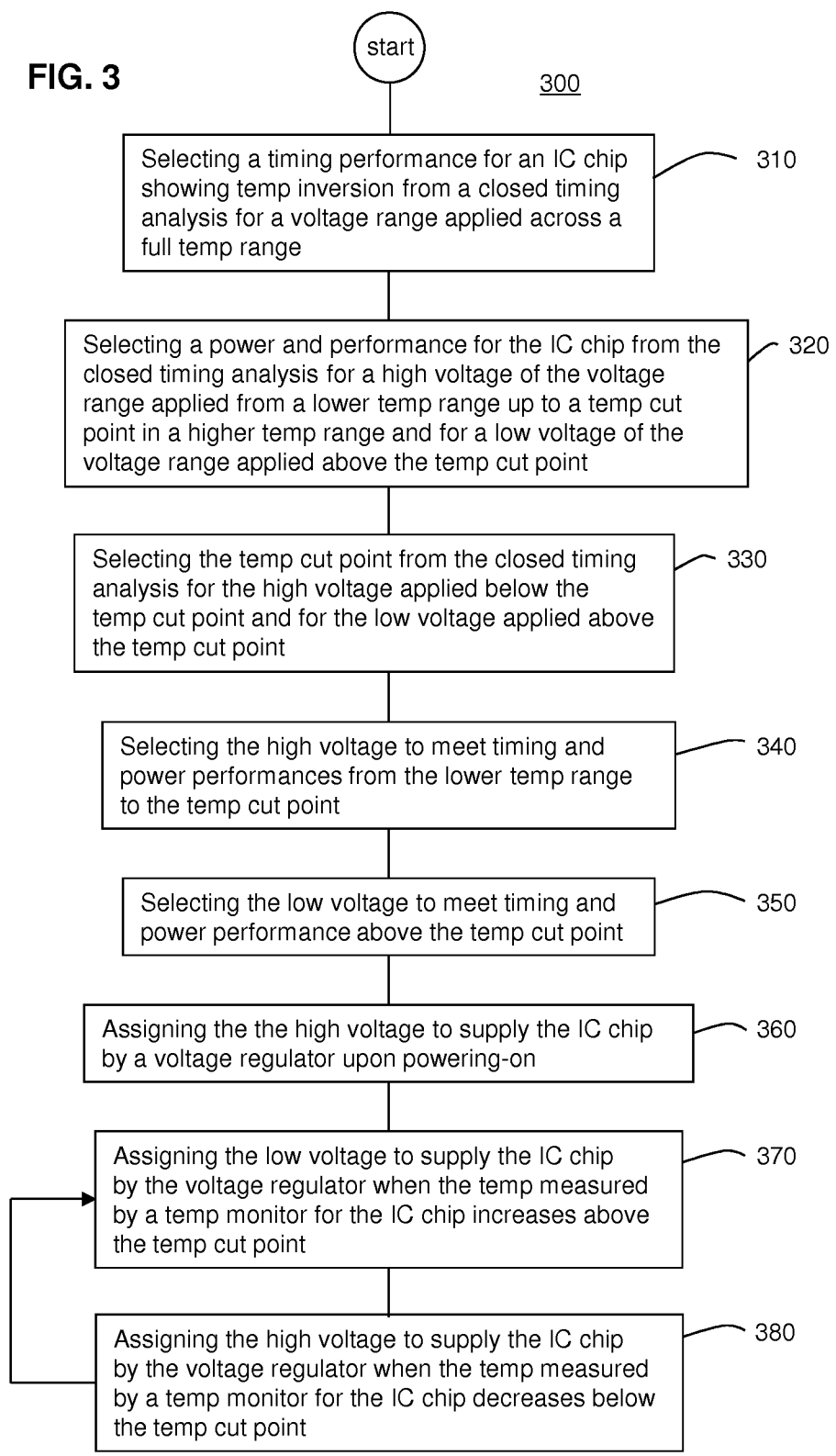

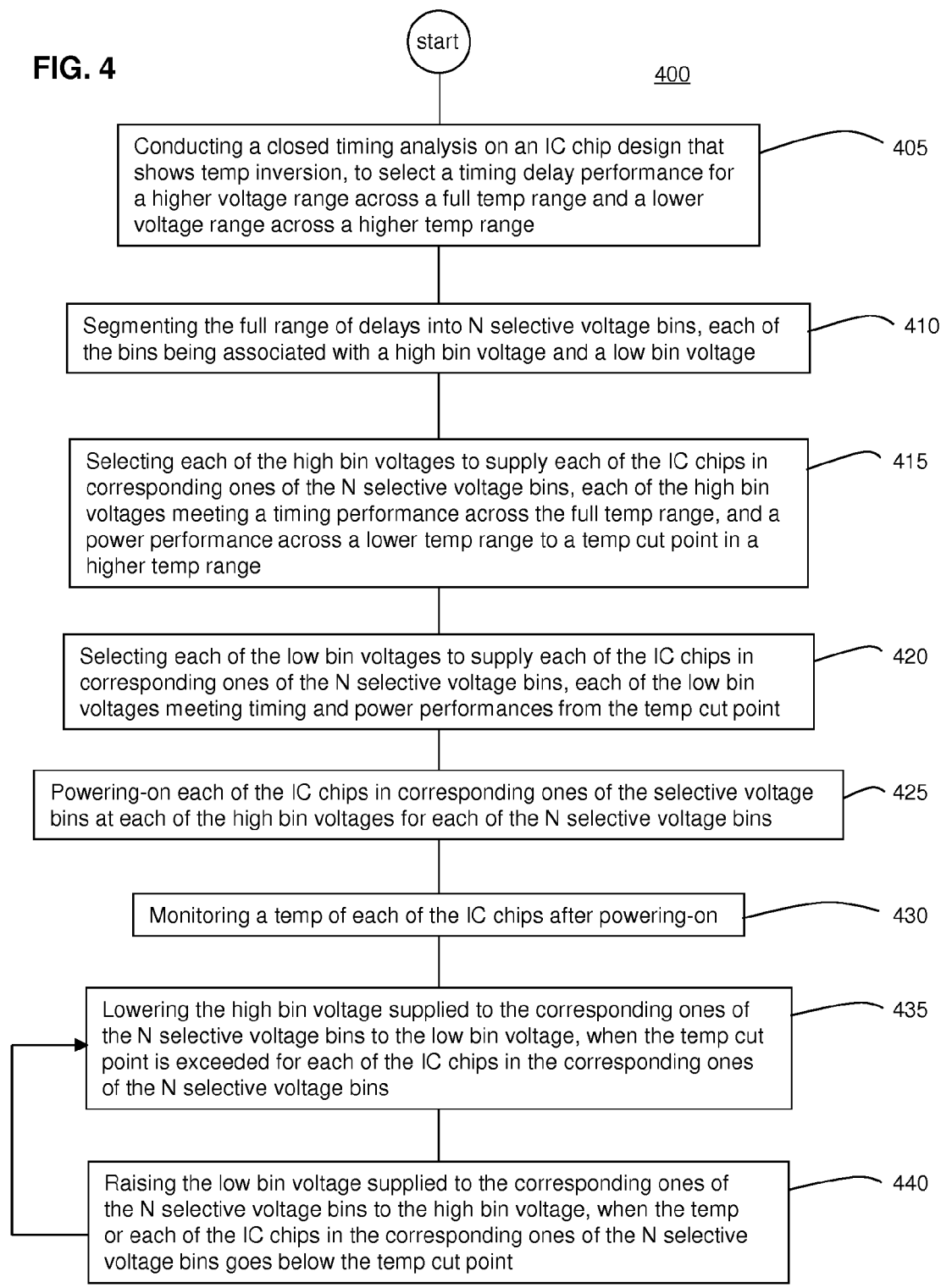

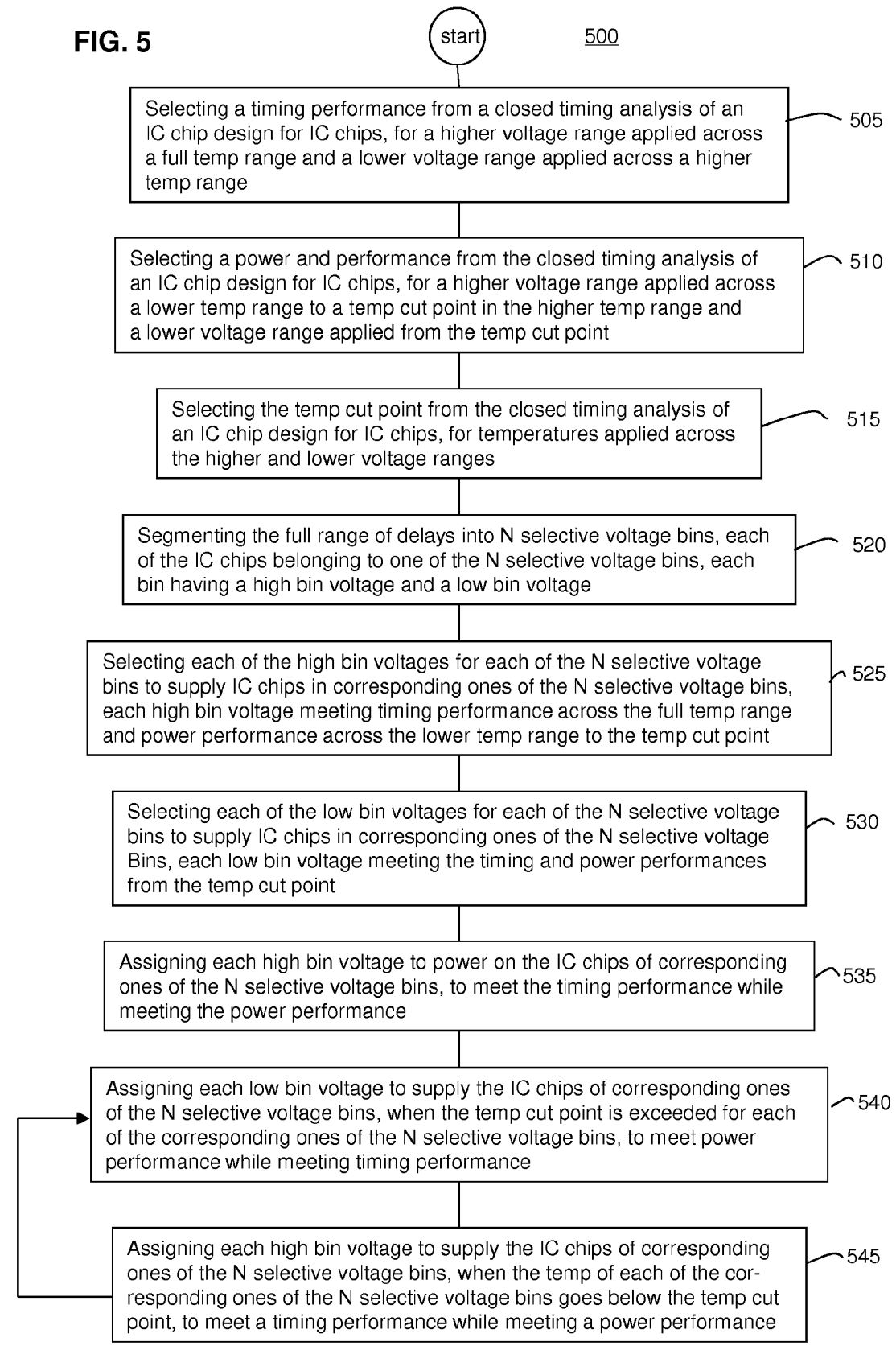

POWER AND TIMING OPTIMIZATION FOR AN INTEGRATED CIRCUIT BY VOLTAGE MODIFICATION ACROSS VARIOUS RANGES OF TEMPERATURES

CROSS-REFERENCE TO RELATED APPLICATIONS

This application is a divisional of U.S. Pat. No. 8,543,960, issued Sep. 24, 2013, the complete disclosure of which is incorporated herein by reference.

BACKGROUND

1. Field of the Invention

The disclosure generally relates to power and timing optimization of an integrated circuit (IC) chip, using an IC technology that exhibits temperature inversion, by modifying a voltage supplied to the IC chip, while meeting power consumption and timing delay performances across lower and higher temperature ranges.

2. Description of Related Art

Manufacturers of integrated circuits (ICs) seek to reduce, not only, the size of ICs, but also their power consumption. Power consumption of digital integrated circuits consists of two components: dynamic power consumption, associated with active operation of the circuit; and static power consumption, associated with leakage current when the circuit is inactive. Dynamic power consumption refers to the amount of power required to operate a digital circuit, e.g., a logic circuit or latch, and is proportional to value of the supply voltage squared and the frequency of operation. Static power consumption refers to the amount of power consumed by the digital circuit when it is inactive, and is an exponential function of the digital circuit's temperature and voltage.

Digital ICs frequently include a number of standard cells, i.e., standardized digital IC logic circuits or latches, which are characterized by cell libraries. The cell libraries of, for example, a Liberty model, are used during the design phase for the digital ICs and store various operating parameters, e.g., voltage, temperature, timing delay and power consumption ranges.

During the design phase of an IC chip, the cells and their interconnecting pathways may be analyzed in a multidimensional parameterized space, which includes voltage and temperature parameters, to provide a closed timing analysis for the IC chip. A timing performance, as measured by a timing delay, is selected for the IC design from the closed timing analysis.

The manufacture of IC chips to a single IC chip design will result in timing variations among the manufactured IC chips that result from variations of manufacturing process parameters, e.g., chemical mechanical polishing, optical proximity effects, random dopant effects, line-edge roughness, dose and focus variation. Variations in the manufacturing processes can introduce timing variations across chips of a single wafer or across chips from different wafers. Thus, in a population of IC chips manufactured to a single IC chip design, there will be a statistical distribution of subpopulations of IC chips that show smaller timing delays, i.e., fast IC chips, and larger timing delays, i.e., slow IC chips.

During operation, cells of IC chips manufactured from IC technologies, which exhibit temperature inversion, are associated with a negative coefficient of delay with respect to temperature. Thus, as temperatures increase for the cells of an IC chip exhibiting temperature inversion, the timing delay becomes smaller. In contrast, IC chips manufactured from IC technologies, which do not exhibit temperature inversion, show greater timing delays with increasing temperature.

At lower temperatures, cells of an IC chip using an IC technology that shows temperature inversion will have a greater timing delay. When supplied with a low driving voltage, these IC chips may not meet a timing delay performance. To meet a requirement for the timing delay performance, the IC chips can be driven at a high voltage at the lower temperatures. However, driving the IC chips at a high voltage results in increased dynamic and static power consumption. Alternatively, only those IC chips having a sufficiently high performance at the lower temperatures may be selected from a population of manufactured IC chips to meet the timing delay performance. This selection necessarily results in a smaller number of IC chips that are available.

At higher temperatures, cells using an IC technology that shows temperature inversion will show both increased dynamic and static power consumption, because voltage needs to be raised in order to meet performance at low temperature. This increased voltage causes higher active and leakage power.

There remains a need to optimize power and timing of an integrated circuit (IC) chip, using an IC technology that exhibits temperature inversion, by modifying a voltage supplied to the IC chip, while meeting power and timing delay performances across lower and higher temperature ranges.

SUMMARY

In view of the foregoing, an exemplary embodiment of the disclosure may provide a method of optimizing power and timing for an integrated circuit (IC) chip by modifying a voltage supplied to the IC chip, while meeting power consumption and timing delay performances across lower and higher temperature ranges. The method may include selecting a high voltage to be supplied to all of the cells of the IC chip that use an IC technology, which exhibits temperature inversion. The high voltage may meet the timing delay performance of a closed timing analysis for the IC chip across a full temperature range for all operation. The full temperature range may be divided into a lower temperature range and a higher temperature range, where the high voltage meets the power consumption performance across the lower temperature range and a portion of the higher temperature range extending from a lower bound of the higher temperature range to a temperature cut point within a range of temperature cut points in the higher temperature range. The method may also include selecting a low voltage to be supplied to all of the cells of the IC chip. The low voltage may meet the timing delay performance and the power consumption performance from the temperature cut point to an upper bound of the higher temperature range. The method may further include powering-on all of the cells of the IC chip at the high voltage, and monitoring a temperature of the IC chip after power-on. The method may yet further include lowering the high voltage supplied to all of the cells of the IC chip to the low voltage, when the temperature cut point is exceeded, to meet the power consumption performance while meeting the timing delay performance.

Another exemplary embodiment of the disclosure may provide a computer-implemented method of designing a system, including an integrated circuit (IC) chip, that optimizes power and timing for an integrated circuit (IC) chip by modifying a voltage supplied to the IC chip, while meeting power consumption and timing delay performances across lower and higher temperature ranges. The method may include selecting the timing delay performance of the IC chip, where all of the cells of the IC chip use an IC technology that exhibits temperature inversion. The selection of the timing delay performance may result from a closed timing analysis of all of the cells of the IC chip over a multi-dimensional parameterized space, including a high voltage being applied across a full temperature range, which may be divided into a lower temperature range and a higher temperature range, and a low voltage being applied across the higher temperature range. The method may also include selecting the power consumption performance of the IC chip. The selection of the power consumption performance may result from a closed timing analysis of all of the cells of said IC chip over a multi-dimensional parameterized space, including the high voltage being applied across the lower temperature range and a portion of the higher temperature range extending from a lower bound of the higher temperature range to a temperature cut point within the higher temperature range, and the low voltage being applied from the temperature cut point to an upper bound of the higher temperature range. The method may further include selecting a high voltage to be supplied to all of the cells of the IC chip. The high voltage may meet the timing delay performance for the IC chip across the full temperature range, which may be divided into a lower temperature range and a higher temperature range. The high voltage may meet the power consumption performance across the lower temperature range and a portion of the higher temperature range extending from a lower bound of the higher temperature range to a temperature cut point within a range of temperature cut points in the higher temperature range. The method may yet further include selecting a low voltage to be supplied to all of the cells of the IC chip. The low voltage may meet the timing delay performance and the power consumption performance from the temperature cut point to an upper bound of the higher temperature range. The method may yet further include selecting the temperature cut point from the range of temperature cut points having a lowermost value adjacent to an upper bound of the lower temperature range, where the high voltage being lowered to the low voltage maintains the timing delay performance for the IC chip, and an uppermost value, where the high voltage being lowered to the low voltage is required to meet the power consumption performance for the IC chip. The method may yet further include assigning the high voltage to be supplied to all of the cells of the IC chip by a voltage regulator of the system, upon powering-on said system, and assigning the low voltage to be supplied to all of the cells of the IC chip by the voltage regulator, when a temperature of the IC chip monitored by a temperature monitor of the system indicates the temperature cut point is exceeded.

Yet another exemplary embodiment of the disclosure may provide a non-transitory computer program storage device readable by a computer, tangibly embodying a program of instructions executable by the computer to perform a method of optimizing power and timing for an integrated circuit (IC) chip by modifying a voltage supplied to the IC chip, while meeting power consumption and timing delay performances across lower and higher temperature ranges. The method may include selecting a high voltage to be supplied to all of the cells of the IC chip that use an IC technology, which exhibits temperature inversion. The high voltage may meet the timing delay performance of a closed timing analysis for the IC chip across a full temperature range for all operation. The full temperature range may be divided into a lower temperature range and a higher temperature range, where the high voltage meets the power consumption performance across the lower temperature range and a portion of the higher temperature range extending from a lower bound of the higher temperature range to a temperature cut point within a range of temperature cut points in the higher temperature range. The method may also include selecting a low voltage to be supplied to all of the cells of the IC chip. The low voltage may meet the timing delay performance and the power consumption performance from the temperature cut point to an upper bound of the higher temperature range. The method may further include powering-on all of the cells of the IC chip at the high voltage, and monitoring a temperature of the IC chip after power-on. The method may yet further include lowering the high voltage supplied to all of the cells of the IC chip to the low voltage, when the temperature cut point is exceeded, to meet the power consumption performance while meeting the timing delay performance.

Yet another exemplary embodiment of the disclosure may prove a method that optimizes power and timing by modifying a voltage supplied to each of a population of integrated circuit (IC) chips, while meeting power consumption and timing delay performances for each of the population of IC chips across lower and higher temperature ranges. The method may include conducting a closed timing analysis on an IC chip design, using an IC technology that exhibits temperature inversion, to select the timing delay performance over a multi-dimensional parameterized space, including a higher voltage range being applied across a full temperature range, which may be divided into a lower temperature range and a higher temperature range, and a lower voltage range being applied across the higher temperature range. The method may also include segmenting the full temperature range into N selective voltage bins, each of the population of IC chips, manufactured to the IC chip design, belonging to one of the N selective voltage bins and each of the N selective bins being associated with a high bin voltage and a low bin voltage. The method may further include selecting each of the high bin voltages for each of the N selective voltage bins from the higher voltage range to be supplied to each of the population of IC chips in corresponding ones of the N selective voltage bins. Each of the high bin voltages for each of the N selective voltage bins may meet the timing delay performance across the full temperature range and the power consumption performance across the lower temperature range and a portion of the higher temperature range extending from a lower bound of the higher temperature range to a temperature cut point within a range of temperature cut points in the higher temperature range. The method may yet further include selecting each of the low bin voltages for each of the N selective voltage bins from the lower voltage range to be supplied to each of the population of IC chips in the corresponding ones of the N selective voltage bins. Each of the low bin voltages for each of the N selective voltage bins may meet the timing delay performance and the power consumption performance from the temperature cut point to an upper bound of the higher temperature range. The method may yet further include powering-on each of the population of IC chips in each of the corresponding ones of the N selective voltage bins at each of the high bin voltages for each of the N selective voltage bins, and monitoring a temperature of each of the population of IC chips after powering-on. The method may yet further include lowering the high bin voltage supplied to each of the population of IC chips in each of the corresponding ones of the N selective voltage bins to the low bin voltage for each of the corresponding ones of the N selective voltage bins, when the temperature cut point is exceeded for each of the population of IC chips in each of the corresponding ones of the N selective voltage bins, to meet the power consumption performance while meeting the timing delay performance.

BRIEF DESCRIPTION OF THE DRAWINGS

The embodiments herein will be better understood from the following detailed description with reference to the drawings, which are not necessarily drawn to scale and in which:

FIG. 2 is a flowchart illustrating a method of optimizing power and timing for an IC chip by modifying a voltage supplied to the IC chip, while meeting power consumption and timing delay performances across lower and higher temperature ranges in an exemplary embodiment;

FIG. 3 is a flowchart illustrating a computer-implemented method of designing a system, including an IC chip, that optimizes power and timing for the IC chip by modifying a voltage supplied to the IC chip, while meeting power consumption and timing delay performances across lower and higher temperature ranges in an exemplary embodiment;

FIG. 4 is a flowchart illustrating a method that optimizes power and timing by modifying a voltage supplied to each of a population of IC chips, while meeting power consumption and timing delay performances for each of said population of IC chips across lower and higher temperature ranges in an exemplary embodiment;

FIG. 5 is a flowchart illustrating a computer-implemented method of designing a system that optimizes power and timing by modifying a voltage supplied to each of a population of IC chips, while meeting power consumption and timing delay performances for each of said population of IC chips across lower and higher temperature ranges in an exemplary embodiment.

DETAILED DESCRIPTION

Figure 1A:
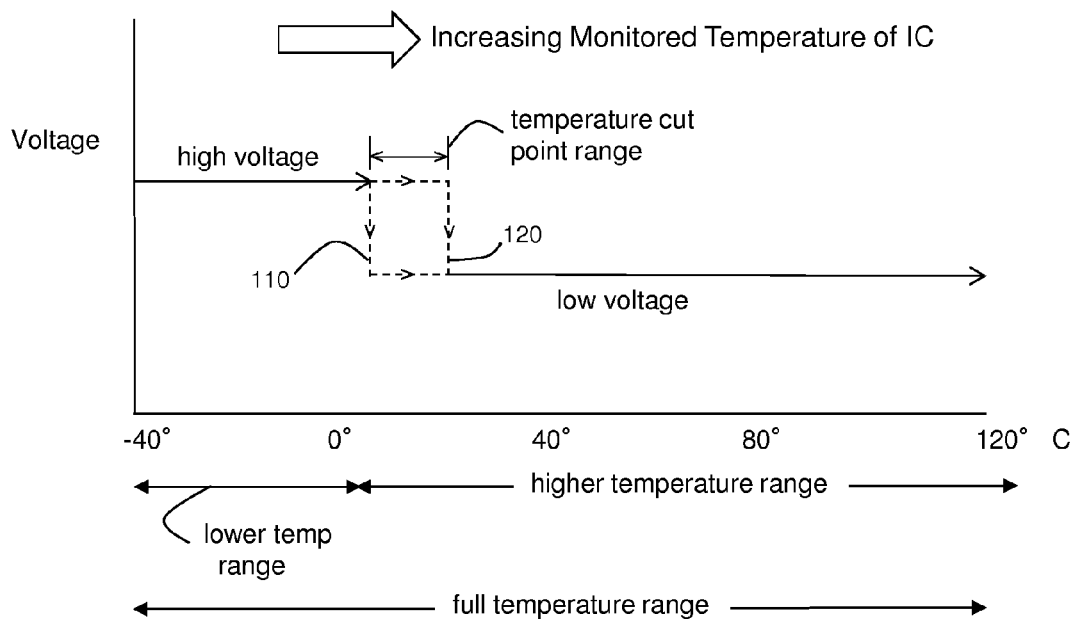
FIG. 1A is a schematic diagram illustrating a high voltage being lowered to a low voltage for an IC chip exhibiting temperature inversion at a temperature cut point as the temperature of the IC chip increases in an exemplary embodiment.

The exemplary embodiments of the disclosure and their various features and advantageous details are explained more fully with reference to the non-limiting exemplary embodiments that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary embodiments of the disclosure. The examples used herein are intended to merely facilitate an understanding of ways in which the exemplary embodiments of the disclosure may be practiced and to further enable those of skill in the art to practice the exemplary embodiments of the disclosure. Accordingly, the examples should not be construed as limiting the scope of the exemplary embodiments of the disclosure.

As described above, there remains a need to optimize power and timing of an integrated circuit (IC) chip, using an IC technology that exhibits temperature inversion, by modifying a voltage supplied to the IC chip, while meeting power consumption and timing delay performances across lower and higher temperature ranges.

Various exemplary embodiments of the disclosure may take advantage of the negative temperature coefficient for a timing delay exhibited by a IC chip, by selecting a high voltage to be supplied to the IC chip over a lower temperature range to overcome a poor timing delay performance, while meeting a power consumption performance, and by selecting a low voltage to be supplied to the IC chip over a higher temperature range to reduce increased power consumption, while meeting the timing delay performance.

FIG. 1A schematically illustrates the operation of an IC chip, which exhibits temperature inversion, as the temperature of the IC chip increases over a full temperature range, extending from a lowest possible operating temperature to a highest possible operating temperature in an exemplary embodiment. A closed timing analysis over a multidimensional parameterized space may provide a high voltage that meets a selected timing delay performance for the IC chip over a lower temperature range, which is associated with the major portion of the impact of temperature inversion, while meeting a power consumption performance. However, as the temperature increases to a higher temperature range for the IC chip at the high voltage, the power consumption may increase beyond that associated with the highest value of power consumption for the lower temperature range. Lowering the high voltage supplied to the IC chip at a temperature cut point 110 may reduce the higher power consumption within the higher temperature range, while still meeting the timing delay performance. Thus, temperature cut point 110 may represent the lowest temperature within the higher temperature range, where the high voltage may be lowered and still meet the timing delay performance.

The high voltage supplied to the IC chip at temperatures higher than that of the temperature cut point 110 may be maintained over a range of temperature cut points that meet both the timing delay and power consumption performances. As the temperature increases beyond the temperature cut point 110, power consumption increases until at temperature cut point 120, the power consumption performance may be exceeded. Thus, temperature cut point 120 may represent the highest temperature of the range of temperature cut points, where the high voltage must be lowered to meet the power consumption performance. The temperature cut point range, which extends from the temperature cut point 110 to the temperature cut point 120, meets both the timing delay and power consumption performances for the IC chip with either the high or low supply voltages.

Figure 1B:
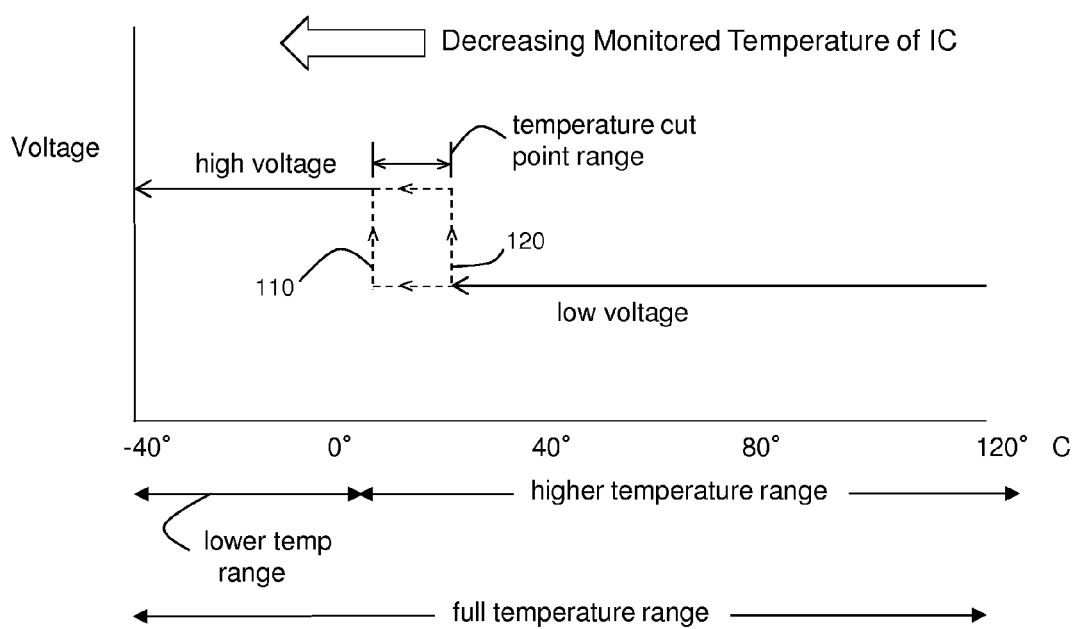
FIG. 1B is a schematic diagram illustrating a low voltage being increased to a high voltage for an IC chip exhibiting temperature inversion at a temperature cut point as the temperature of the IC chip decreases in an exemplary embodiment.

FIG. 1B schematically illustrates the operation of an IC chip, which exhibits temperature inversion, as the temperature of the IC chip decreases over a full temperature range, extending from a highest possible operating temperature to a lowest possible operating temperature in an exemplary embodiment. As the temperature decreases over the higher temperature range, temperature cut point 120 may now represent lowest temperature in the higher temperature range, where either the low or the high supply voltage may meet the power consumption performance, while still meeting the timing performance, and temperature cut point 110 may represent lowest temperature of the higher temperature range, where the low voltage must be increased to the high voltage to meet the timing delay performance.

For given timing delay and power consumption performances, the range of temperature cut points for an IC chip exhibiting temperature inversion will be the same for increasing and decreasing temperatures. However, the selection of a particular temperature cut point within the range of temperature cut points for rising temperatures need not be the same as that for decreasing temperatures. As a first temperature cut point for rising temperatures will be associated with a transition from a high to a low supply voltage in the IC chip, whereas a second temperature cut point for decreasing temperatures will be associated with a transition from a low to a high supply voltage, a simple logic circuit may affect the supply voltage transitions at the first and second temperature cut points.

FIG. 2 illustrates a flow chart 200 of method of optimizing power and timing for an IC chip by modifying a voltage supplied to the IC chip, while meeting power consumption and timing delay performances across lower and higher temperature ranges in an exemplary embodiment. The method may be applied to all cells of the IC chip, which uses an IC technology that exhibits temperature inversion.

Referring to FIG. 2, the method may include selecting a high voltage to be supplied to all cells of the IC chip, in which the high voltage meets a timing delay performance for the IC chip across a full operating temperature range. The full operating temperature range may be divided into a lower temperature range and a high temperature range, which is adjacent to the lower temperature range. The high voltage may further meet a power consumption performance of the IC chip across the lower temperature range and a portion of the higher temperature range extending from a lower bound of the higher temperature range to a temperature cut point within a range of temperature cut points in the higher temperature range, 210. The selecting of the high voltage may result from a closed timing analysis that provides the timing delay and power consumption performances for the IC chip over a multi-dimensional parameterized space, including voltage parameters being applied across the full temperature range, the lower temperature range, and the higher temperature range. The range of temperature cut points may include a lowermost value adjacent to the upper bound of the lower temperature range, where the high supply voltage being lowered to the low supply voltage maintains the timing delay performance of the IC chip, and an uppermost value, where the high supply voltage being lowered to the low supply voltage may be required to meet the power consumption performance of the IC chip. The temperature cut point may result from a closed timing analysis that provides the timing delay performance and power consumption performances for the IC chip over a multi-dimensional parameterized space, including temperature parameters from the higher temperature range being applied across both the selected high voltage and low voltage.

The method may also include selecting a low voltage to be supplied to all of the cells of the IC chip, in which the low voltage meets the timing delay performance and the power consumption performance from the temperature cut point to an upper bound of the higher temperature range, 220. The selecting of the low voltage may result from a closed timing analysis that provides the timing delay and power consumption performances for the IC chip over a multi-dimensional parameterized space, including voltage parameters being applied across the higher temperature range, including the range of temperature cut points.

The method may further include powering-on all of the cells of the IC chip at the high voltage, 230, and monitoring a temperature of the IC chip after the powering-on, 240. The method may yet further include lowering the high voltage supplied to all of the cells of the IC chip to the low voltage, when the temperature cut point is exceeded, to meet the power consumption performance while meeting the timing delay performance, 250.

The method may yet further include increasing the low voltage supplied to all of the cells of the IC chip to the high voltage, when the temperature of the IC chip decreases below the temperature cut point, to meet the timing delay performance while meeting the power consumption performance, 260.

The method of optimizing power and timing for an IC chip by modifying a voltage supplied to the IC chip, while meeting power consumption and timing delay performances across lower and higher temperature ranges, which is embodied by flowchart 200 of FIG. 2 may reside in non-transitory computer program storage device readable by a computer, tangibly embodying a program of instructions executable by the computer to perform the method.

FIG. 3 illustrates a flow chart 300 of a computer-implemented method of designing a system that optimizes power and timing for an IC chip by modifying a voltage supplied to the IC chip, while meeting power consumption and timing delay performances across lower and higher temperature ranges in an exemplary embodiment. The method of design may be applied to a system including: the IC chip, in which all cells of the IC chip use an IC technology that exhibits temperature inversion; a temperature monitor that monitors the temperature of the IC chip; and a voltage regulator that provides one of a high supply voltage and a low supply voltage to the IC chip, according to temperature information received from the temperature monitor in an exemplary embodiment.

Referring to FIG. 3, the method may include selecting the timing delay performance of the IC chip from results of a closed timing analysis of all of the cells of the IC chip over a multi-dimensional parameterized space, including a high voltage of a voltage range being applied across a full operating temperature range, in which the full operating temperature range is divided into a lower temperature range and a higher temperature range, and a low voltage of the voltage being applied across the higher temperature range, 310.

The method may also include selecting the power consumption performance of the IC chip from results of the closed timing analysis of all of the cells of the IC chip, in which power consumption performance is related to both the voltage and the temperature parameters of the multi-dimensional parameterized space for each of the timing performances of each of the cells in the closed timing analysis. The analysis including the high voltage being applied across the lower temperature range and a portion of the higher temperature range extending from a lower bound of the higher temperature range to a temperature cut point within the higher temperature range, and the low voltage being applied from the temperature cut point to an upper bound of the higher temperature range, 320.

The method may yet further include selecting the temperature cut point from the closed timing analysis that provides the timing delay performance and power consumption performances for the IC chip over a multi-dimensional parameterized space, including temperature parameters from the higher temperature range being applied across a voltage range including both a selected high voltage and low voltage, 330. The temperature cut point may be disposed in a range of temperature cut points that includes a lowermost value adjacent to an upper bound of the lower temperature range, where the high supply voltage being lowered to the low supply voltage of the IC chip maintains the timing delay performance, and an uppermost value, where the high supply voltage being lowered to the low supply voltage is required to meet the power consumption performance of the IC chip.

The method may further include selecting the high voltage to be supplied to all of the cells of the IC chip, in which the high voltage meets the timing delay performance for the IC chip across the full operating temperature range. The full operating temperature range may be divided into a lower temperature range and a high temperature range, which is adjacent to the lower temperature range. The high voltage may meet the power consumption performance across the lower temperature range and a portion of the higher temperature range extending from a lower bound of the higher temperature range to a temperature cut point within a range of temperature cut points in the higher temperature range, 340. The selecting of the high voltage may result from a closed timing analysis that provides the timing delay and power consumption performances for the IC chip over a multi-dimensional parameterized space, including voltage parameters being applied across the full temperature range, the lower temperature range, and the higher temperature range.

The method may yet further include selecting the low voltage to be supplied to all of the cells of the IC chip, in which the low voltage meets the timing delay performance and the power consumption performance from the temperature cut point to an upper bound of the higher temperature range, 350.

The method may yet further include assigning the high voltage to be supplied to all of the cells of the IC chip by a voltage regulator of the system, upon powering-on the system, 360, and assigning the low voltage to be supplied to all of the cells of the IC chip by the voltage regulator, when a temperature of the IC chip monitored by a temperature monitor of the system indicates the temperature cut point is exceeded, 370.

The method may yet further include assigning the high voltage to be supplied to all of the cells of the IC chip by the voltage regulator, when the temperature of the IC chip being supplied by the low voltage, decreases below the temperature cut point, as indicated by the temperature monitor, 380.

The method of a computer-implemented method of designing a system that optimizes power and timing for an IC chip by modifying a voltage supplied to the IC chip, while meeting power consumption and timing delay performances across lower and higher temperature ranges, which is embodied by flowchart 300 of FIG. 3 may reside in non-transitory computer program storage device readable by a computer, tangibly embodying a program of instructions executable by the computer to perform the method.

FIG. 4 illustrates a flow chart 400 of method that optimizes power and timing by modifying a voltage supplied to each of a population of IC chips, while meeting power consumption and timing delay performances for each of the population of IC chips across lower and higher temperature ranges in an exemplary embodiment. The method may be applied to each of the population of IC chips that use an IC technology that exhibits temperature inversion.

The method may include conducting a closed timing analysis on an IC chip design to select the timing delay performance over a multi-dimensional parameterized space, including a higher voltage range being applied across a full temperature range, which is divided into a lower temperature range and a higher temperature range, and a lower voltage range being applied across the higher temperature range, 405.

The method may also include segmenting a full range of the performance into N selective voltage bins, where each of the population of IC chips, manufactured to the IC chip design, may belong to one of the N selective voltage bins. Each of the selective voltage bins may be associated with a high bin voltage and a low bin voltage, 410. Selective voltage binning is well known in the art for IC chips that use an IC technology, which does not exhibit temperature inversion, and involves dividing a population of IC chips into bins according to their operating speeds. Relatively fast IC chips with high operating speeds will operate at lower voltages to keep the operating speeds and power consumption approximately equal to relatively slow IC chips. In the exemplary embodiment, selective voltage binning may be applied to the population of IC chips that use an IC technology that exhibits temperature inversion.

The method may further include selecting each of the high bin voltages for each of the N selective voltage bins from the higher voltage range to be supplied to each of the population of IC chips in corresponding ones of the N selective voltage bins, 415. Each of the high bin voltages for each of the N selective voltage bins may meet the timing delay performance for each of the population of IC chips in the corresponding ones of the N selective voltage bins across the full temperature range, and the power consumption performance for each of the population of IC chips in the corresponding ones of the N selective voltage bins across the lower temperature range and a portion of the higher temperature range extending from a lower bound of the higher temperature range to a temperature cut point within a range of temperature cut points in the higher temperature range.

The method may yet further include selecting each of the low bin voltages for each of the N selective voltage bins from the lower voltage range to be supplied to each of the population of IC chips in the corresponding ones of the N selective voltage bins, 420. Each of the low bin voltages for each of the N selective voltage bins may meet the timing delay performance and the power consumption performance for each of the population of IC chips in the corresponding ones of the N selective voltage bins from the temperature cut point to an upper bound of the higher temperature range.

The method may yet further include powering-on each of the population of IC chips in each of the corresponding ones of the N selective voltage bins at each of the high bin voltages for each of the N selective voltage bins, 425, and monitoring a temperature of each of the population of IC chips after powering-on, 430.

The method may yet further include lowering the high bin voltage supplied to each of the population of IC chips in each of the corresponding ones of the N selective voltage bins to the low bin voltage for each of the corresponding ones of the N selective voltage bins, when the temperature cut point is exceeded for each of the population of IC chips in each of the corresponding ones of the N selective voltage bins, to meet the power consumption performance while meeting the timing delay performance, 435.

The method may yet further include increasing the low bin voltage supplied to each of the population of IC chips in each of the corresponding ones of the N selective voltage bins, to the high voltage, when the temperature of each of the population of IC chips in each of the corresponding ones of the N selective voltage bins decreases below the temperature cut point, to meet the timing delay performance while meeting the power consumption performance, 440.

The method that optimizes power and timing by modifying a voltage supplied to each of a population of integrated circuit (IC) chips, while meeting power consumption and timing delay performances for each of said population of IC chips across lower and higher temperature ranges, which is embodied by flowchart 400 of FIG. 4 may reside in non-transitory computer program storage device readable by a computer, tangibly embodying a program of instructions executable by the computer to perform the method.

FIG. 5 illustrates a flow chart 500 of a computer-implemented method of designing a system that optimizes power and timing by modifying a voltage supplied to each of a population of integrated circuit (IC) chips, while meeting power consumption and timing delay performances for each of said population of IC chips across lower and higher temperature ranges in an exemplary embodiment. The method of design may be applied to a system including: a population of IC chips that have been segmented into N selective voltage bins and where each of the population of IC chips uses an IC technology that exhibits temperature inversion; a plurality of temperature monitors that monitor the temperature of each of the population of IC chips belonging to one of the N selective voltage bins; a multi-port voltage regulator that provides one of a high bin voltage and a low bin voltage to each of the population of IC chips belonging to one of the N selective voltage bins; and a logic circuit that receives temperatures from each of the plurality of temperature monitors and compares each of the temperatures received from each of the population of IC chips belonging to one of the N selective voltage bins to a temperature cut point to determine whether the high bin voltage or the low bin voltage should be supplied by the multi-port voltage regulator to each of the population of IC chips belonging to one of the N selective voltage bins in an exemplary embodiment.

Referring to FIG. 5, the method may include selecting a timing delay performance from a closed timing analysis of an IC chip design to be used for the population of IC chips. The closed timing analysis may be conducted over a multi-dimensional parameterized space, including a higher voltage range being applied across a full temperature range, which is divided into a lower temperature range and a higher temperature range, and a lower voltage range being applied across the higher temperature range, 505.

The method may also include selecting the power consumption performance of the population of IC chips from results of the closed timing analysis of the IC chip design, including the higher voltage range being applied across the lower temperature range and a portion of the higher temperature range extending from a lower bound of the higher temperature range to a temperature cut point within the higher temperature range, and the lower voltage range being applied from the temperature cut point to an upper bound of the higher temperature range, 510.

The method may further include selecting the temperature cut point from the closed timing analysis that provides the timing delay performance and power consumption performances for the IC chip design over a multi-dimensional parameterized space, including temperature parameters from the higher temperature range being applied across both the selected higher voltage range and lower voltage range, 515.

The method may yet further include segmenting a full range of the timing delay performance into N selective voltage bins, where each of the population of IC chips, manufactured to the IC chip design, may belong to one of the N selective voltage bins. Each of the selective voltage bins may be associated with a high bin voltage and a low bin voltage, 520.

The method may further include selecting each of the high bin voltages for each of the N selective voltage bins from the higher voltage range to be supplied to each of the population of IC chips in corresponding ones of the N selective voltage bins, 525. Each of the high bin voltages for each of the N selective voltage bins may meet the timing delay performance for each of the population of IC chips in the corresponding ones of the N selective voltage bins across the full temperature range, and the power consumption performance for each of the population of IC chips in the corresponding ones of the N selective voltage bins across the lower temperature range and a portion of the higher temperature range extending from a lower bound of the higher temperature range to a temperature cut point within a range of temperature cut points in the higher temperature range.

The method may yet further include selecting each of the low bin voltages for each of the N selective voltage bins from the lower voltage range to be supplied to each of the population of IC chips in the corresponding ones of the N selective voltage bins, 530. Each of the low bin voltages for each of the N selective voltage bins may meet the timing delay performance and the power consumption performance for each of the population of IC chips in the corresponding ones of the N selective voltage bins from the temperature cut point to an upper bound of the higher temperature range.

The method may yet further include assigning each of the high bin voltages for each of the N selective voltage bins to power-on each of the population of IC chips in each of the corresponding ones of the N selective voltage bins, to meet the timing delay performance while meeting the power consumption performance, 535, and assigning each of the low bin voltages for each of the N selective voltage bins to be supplied to each of the population of IC chips in each of the corresponding ones of the N selective voltage bins, when the temperature cut point is exceeded for each of the population of IC chips in each of the corresponding ones of the N selective voltage bins, to meet the power consumption performance while meeting the timing delay performance, 540.

The method may yet further include increasing the low bin voltage supplied to each of the population of IC chips in each of the corresponding ones of the N selective voltage bins, to the high voltage, when the temperature of each of the population of IC chips in each of the corresponding ones of the N selective voltage bins decreases below the temperature cut point, to meet the timing delay performance while meeting the power consumption performance, 545.

The method that optimizes power and timing by modifying a voltage supplied to each of a population of integrated circuit (IC) chips, while meeting power consumption and timing delay performances for each of said population of IC chips across lower and higher temperature ranges, which is embodied by flowchart 500 of FIG. 5 may reside in non-transitory computer program storage device readable by a computer, tangibly embodying a program of instructions executable by the computer to perform the method.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
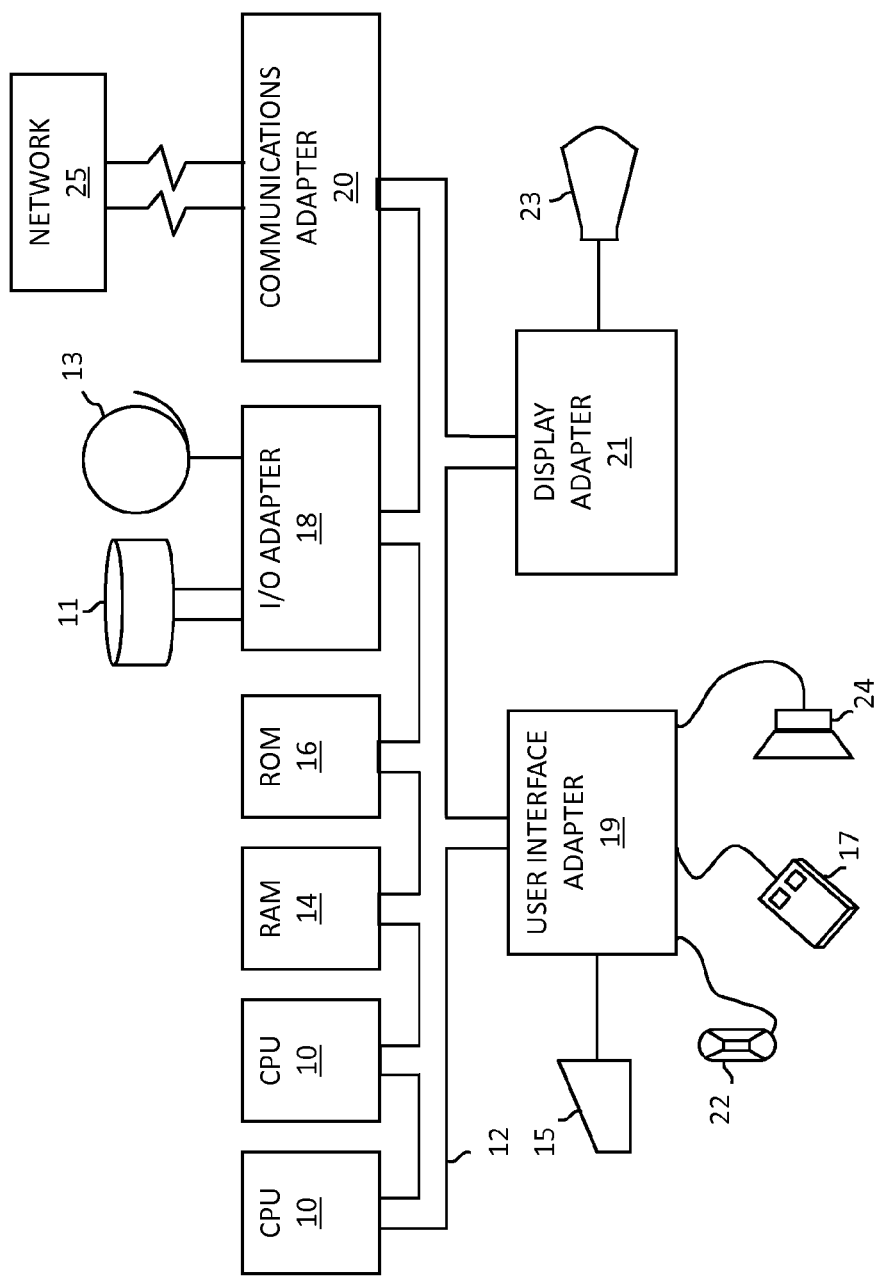
FIG. 6 is a schematic diagram illustrating representative hardware environment for practicing the methods of the exemplary embodiments.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor

What is claimed is:

1. A method that optimizes power and timing by modifying a voltage supplied to each of a population of integrated circuit (IC) chips, while meeting power consumption and timing delay performances for each of said population of IC chips across lower and higher temperature ranges, said method comprising:

conducting a closed timing analysis on an IC chip design, using an IC technology that exhibits temperature inversion, to select said timing delay performance over a multi-dimensional parameterized space, including a higher voltage range being applied across a full temperature range, said full temperature range being divided into a lower temperature range and a higher temperature range, and a lower voltage range being applied across said higher temperature range;

segmenting a full range of said timing delay performance into N selective voltage bins, each of said population of IC chips, manufactured to said IC chip design, belonging to one of said N selective voltage bins and each of said N selective bins being associated with a high bin voltage and a low bin voltage;

selecting each of said high bin voltages for each of said N selective voltage bins from said higher voltage range to be supplied to each of said population of IC chips in corresponding ones of said N selective voltage bins, each of said high bin voltages for each of said N selective voltage bins meeting said timing delay performance across said full temperature range and said power consumption performance across said lower temperature range and a portion of said higher temperature range extending from a lower bound of said higher temperature range to a temperature cut point within a range of temperature cut points in said higher temperature range;

selecting each of said low bin voltages for each of said N selective voltage bins from said lower voltage range to be supplied to each of said population of IC chips in said corresponding ones of said N selective voltage bins, each of said low bin voltages for each of said N selective voltage bins meeting said timing delay performance and said power consumption performance from said temperature cut point to an upper bound of said higher temperature range;

powering-on each of said population of IC chips in each of said corresponding ones of said N selective voltage bins at each of said high bin voltages for each of said N selective voltage bins;

after said powering-on, monitoring a temperature of each of said population of IC chips; and lowering said high bin voltage supplied to each of said population of IC chips in each of said corresponding ones of said N selective voltage bins to said low bin voltage for each of said corresponding ones of said N selective voltage bins, when said temperature cut point is exceeded for each of said population of IC chips in each of said corresponding ones of said N selective voltage bins, to meet said power consumption performance while meeting said timing delay performance.

2. The method of claim 1, further comprising:

increasing said low bin voltage supplied to each of said population of IC chips in each of said corresponding ones of said N selective voltage bins to said high bin voltage for each of said corresponding ones of said N selective voltage bins, when said temperature of each of said population of IC chips in each of said corresponding ones of said N selective voltage bins decreases below said temperature cut point, to meet said timing delay performance while meeting said power consumption performance.

3. The method of claim 1, a range of temperature cut points including a lowermost value adjacent to an upper bound of said lower temperature range, where each of said high bin voltages for each of said corresponding ones of said N selective voltage bins being lowered to each of said low bin voltages for each of said corresponding ones of said N selective voltage bins, maintains said timing delay performance for each of said population of IC chips in each of said corresponding ones of said N selective voltage bins, and an uppermost value, where each of said high bin voltages for each of said corresponding ones of said N selective voltage bins being lowered to each of said low bin voltages for each of said corresponding ones of said N selective voltage bins, is required to meet said power consumption performance for said IC chip.

4. The method of claim 1, said selecting of each of said high bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including higher voltage range parameters being applied across said full temperature range, said lower temperature range, and said higher temperature range.

5. The method of claim 4, said selecting of each of said low bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including lower range voltage parameters being applied across said higher temperature range.

6. The method of claim 5, said temperature cut point resulting from a closed timing analysis that provides said timing delay and power consumption performances for each of said population of IC chips in each of said corresponding ones of said N selective voltage bins over a multi-dimensional parameterized space, including temperature parameters from said higher temperature range being applied across said higher voltage range and said lower voltage range.

7. The method of claim 6, said each of said population of IC chips in each of said corresponding ones of said N selective voltage bins having a first power consumption for each of said corresponding ones of said N selective voltage bins at each of said high bin voltages and said temperature cut point that is greater than that of a second power consumption for said each of said corresponding ones of said N selective voltage bins at each of said low bin voltages and said temperature cut point.

8. A method that optimizes power and timing by modifying a voltage supplied to each of a population of integrated circuit (IC) chips, while meeting power consumption and timing delay performances for each of said population of IC chips across lower and higher temperature ranges, said method comprising:

conducting a closed timing analysis on an IC chip design, using an IC technology that exhibits temperature inversion, to select said timing delay performance over a multi-dimensional parameterized space, including a higher voltage range being applied across a full temperature range, said full temperature range being divided into a lower temperature range and a higher temperature range, and a lower voltage range being applied across said higher temperature range;

segmenting a full range of said timing delay performance into N selective voltage bins, each of said population of IC chips, manufactured to said IC chip design, belonging to one of said N selective voltage bins and each of said N selective bins being associated with a high bin voltage and a low bin voltage;

selecting each of said high bin voltages for each of said N selective voltage bins from said higher voltage range to be supplied to each of said population of IC chips in corresponding ones of said N selective voltage bins, each of said high bin voltages for each of said N selective voltage bins meeting said timing delay performance across said full temperature range and said power consumption performance across said lower temperature range and a portion of said higher temperature range extending from a lower bound of said higher temperature range to a temperature cut point within a range of temperature cut points in said higher temperature range;

selecting each of said low bin voltages for each of said N selective voltage bins from said lower voltage range to be supplied to each of said population of IC chips in said corresponding ones of said N selective voltage bins, each of said low bin voltages for each of said N selective voltage bins meeting said timing delay performance and said power consumption performance from said temperature cut point to an upper bound of said higher temperature range;

powering-on each of said population of IC chips in each of said corresponding ones of said N selective voltage bins at each of said high bin voltages for each of said N selective voltage bins;

after said powering-on, monitoring a temperature of each of said population of IC chips;

lowering said high bin voltage supplied to each of said population of IC chips in each of said corresponding ones of said N selective voltage bins to said low bin voltage for each of said corresponding ones of said N selective voltage bins, when said temperature cut point is exceeded for each of said population of IC chips in each of said corresponding ones of said N selective voltage bins, to meet said power consumption performance while meeting said timing delay performance; and increasing said low bin voltage supplied to each of said population of IC chips in each of said corresponding ones of said N selective voltage bins to said high bin voltage for each of said corresponding ones of said N selective voltage bins, when said temperature of each of said population of IC chips in each of said corresponding ones of said N selective voltage bins decreases below said temperature cut point, to meet said timing delay performance while meeting said power consumption performance.

9. The method of claim 8, a range of temperature cut points including a lowermost value adjacent to an upper bound of said lower temperature range, where each of said high bin voltages for each of said corresponding ones of said N selective voltage bins being lowered to each of said low bin voltages for each of said corresponding ones of said N selective voltage bins, maintains said timing delay performance for each of said population of IC chips in each of said corresponding ones of said N selective voltage bins, and an uppermost value, where each of said high bin voltages for each of said corresponding ones of said N selective voltage bins being lowered to each of said low bin voltages for each of said corresponding ones of said N selective voltage bins, is required to meet said power consumption performance for said IC chip.

10. The method of claim 8, said selecting of each of said high bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including higher voltage range parameters being applied across said full temperature range, said lower temperature range, and said higher temperature range.

11. The method of claim 10, said selecting of each of said low bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including lower range voltage parameters being applied across said higher temperature range.

12. The method of claim 11, said temperature cut point resulting from a closed timing analysis that provides said timing delay and power consumption performances for each of said population of IC chips in each of said corresponding ones of said N selective voltage bins over a multi-dimensional parameterized space, including temperature parameters from said higher temperature range being applied across said higher voltage range and said lower voltage range.

13. The method of claim 12, said each of said population of IC chips in each of said corresponding ones of said N selective voltage bins having a first power consumption for each of said corresponding ones of said N selective voltage bins at each of said high bin voltages and said temperature cut point that is greater than that of a second power consumption for said each of said corresponding ones of said N selective voltage bins at each of said low bin voltages and said temperature cut point.

14. A method that optimizes power and timing by modifying a voltage supplied to each of a population of integrated circuit (IC) chips, while meeting power consumption and timing delay performances for each of said population of IC chips across lower and higher temperature ranges, said method comprising:

conducting a closed timing analysis on an IC chip design, using an IC technology that exhibits temperature inversion, to select said timing delay performance over a multi-dimensional parameterized space, including a higher voltage range being applied across a full temperature range, said full temperature range being divided into a lower temperature range and a higher temperature range, and a lower voltage range being applied across said higher temperature range;

segmenting a full range of said timing delay performance into N selective voltage bins, each of said population of IC chips, manufactured to said IC chip design, belonging to one of said N selective voltage bins and each of said N selective bins being associated with a high bin voltage and a low bin voltage;

selecting each of said high bin voltages for each of said N selective voltage bins from said higher voltage range to be supplied to each of said population of IC chips in corresponding ones of said N selective voltage bins, each of said high bin voltages for each of said N selective voltage bins meeting said timing delay performance across said full temperature range and said power consumption performance across said lower temperature range and a portion of said higher temperature range extending from a lower bound of said higher temperature range to a temperature cut point within a range of temperature cut points in said higher temperature range;

selecting each of said low bin voltages for each of said N selective voltage bins from said lower voltage range to be supplied to each of said population of IC chips in said corresponding ones of said N selective voltage bins, each of said low bin voltages for each of said N selective voltage bins meeting said timing delay performance and said power consumption performance from said temperature cut point to an upper bound of said higher temperature range;

powering-on each of said population of IC chips in each of said corresponding ones of said N selective voltage bins at each of said high bin voltages for each of said N selective voltage bins;

after said powering-on, monitoring a temperature of each of said population of IC chips;

lowering said high bin voltage supplied to each of said population of IC chips in each of said corresponding ones of said N selective voltage bins to said low bin voltage for each of said corresponding ones of said N selective voltage bins, when said temperature cut point is exceeded for each of said population of IC chips in each of said corresponding ones of said N selective voltage bins, to meet said power consumption performance while meeting said timing delay performance; and a range of temperature cut points including a lowermost value adjacent to an upper bound of said lower temperature range, where each of said high bin voltages for each of said corresponding ones of said N selective voltage bins being lowered to each of said low bin voltages for each of said corresponding ones of said N selective voltage bins, maintains said timing delay performance for each of said population of IC chips in each of said corresponding ones of said N selective voltage bins, and an uppermost value, where each of said high bin voltages for each of said corresponding ones of said N selective voltage bins being lowered to each of said low bin voltages for each of said corresponding ones of said N selective voltage bins, is required to meet said power consumption performance for said IC chip.

15. The method of claim 14, further comprising:

increasing said low bin voltage supplied to each of said population of IC chips in each of said corresponding ones of said N selective voltage bins to said high bin voltage for each of said corresponding ones of said N selective voltage bins, when said temperature of each of said population of IC chips in each of said corresponding ones of said N selective voltage bins decreases below said temperature cut point, to meet said timing delay performance while meeting said power consumption performance.

16. The method of claim 14, said selecting of each of said high bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including higher voltage range parameters being applied across said full temperature range, said lower temperature range, and said higher temperature range.

17. The method of claim 16, said selecting of each of said low bin voltages for each of said N selective voltage bins resulting from a closed timing analysis that provides said timing delay and power consumption performances for each of said population of IC chips in each of said corresponding ones of said N selective voltage bins over a multi-dimensional parameterized space, including lower range voltage parameters being applied across said higher temperature range.

18. The method of claim 17, said temperature cut point resulting from a closed timing analysis that provides said timing delay and power consumption performances for each of said population of IC chips in each of said corresponding ones of said N selective voltage bins over a multi-dimensional parameterized space, including temperature parameters from said higher temperature range being applied across said higher voltage range and said lower voltage range.

19. The method of claim 18, said each of said population of IC chips in each of said corresponding ones of said N selective voltage bins having a first power consumption for each of said corresponding ones of said N selective voltage bins at each of said high bin voltages and said temperature cut point that is greater than that of a second power consumption for said each of said corresponding ones of said N selective voltage bins at each of said low bin voltages and said temperature cut point.

* * * * *